Oct. 6, 1931. J. S. McCHESNEY Re. 18,219

WIRE TYING APPLIANCE

Original Filed Nov. 13, 1916 3 Sheets-Sheet 1

INVENTOR
John S. McChesney
BY
N. J. Bernhard
ATTORNEY

Oct. 6, 1931. J. S. McCHESNEY Re. 18,219
WIRE TYING APPLIANCE
Original Filed Nov. 13, 1916 3 Sheets-Sheet 2
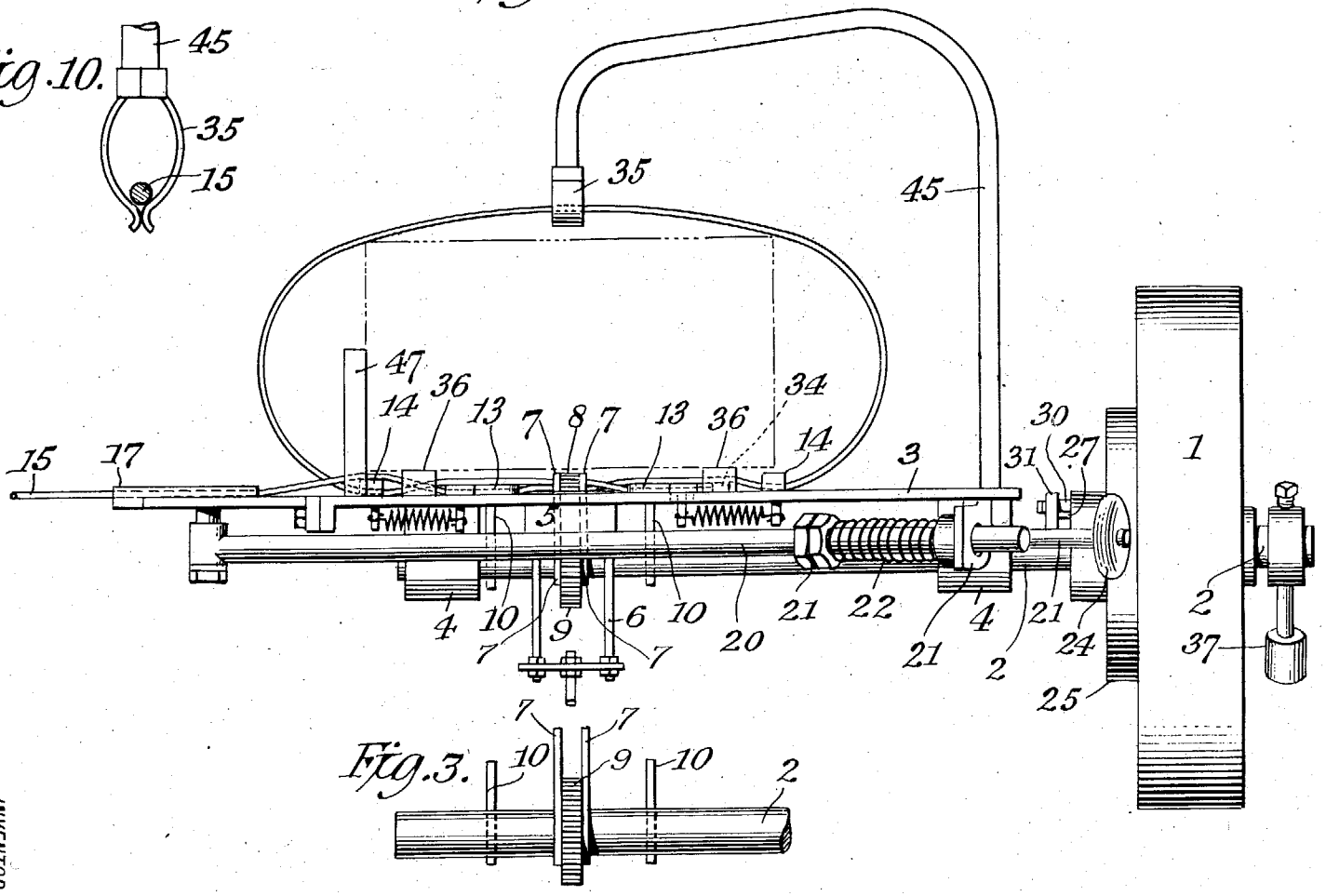
INVENTOR
John S. McChesney
BY
W. F. Bernhard
ATTORNEY

WIRE TYING APPLIANCE

Original Filed Nov. 13, 1916 3 Sheets-Sheet 3

INVENTOR
John S. McChesney
BY
N. C. Burkhart
ATTORNEY

Reissued Oct. 6, 1931

Re. 18,219

UNITED STATES PATENT OFFICE

JOHN SHERMAN McCHESNEY, OF CHICAGO, ILLINOIS, ASSIGNOR, BY MESNE ASSIGNMENTS, TO THE GERRARD COMPANY, INC., OF SAN FRANCISCO, CALIFORNIA, A CORPORATION OF DELAWARE

WIRE TYING APPLIANCE

Original No. 1,360,236, dated November 23, 1920, Serial No. 130,941, filed November 13, 1916. Application for reissue filed October 31, 1922. Serial No. 598,200.

My invention relates to packaging, and more particularly to means for rapidly, neatly and effectively using wire for banding or tying boxes, lumber, shingles, laths, pipes, or other objects. In using wire for such purposes, it has been customary heretofore to start with a cut length of wire and to intertwist the free ends of the wire with pliers or the like, thereby leaving an unsightly projecting portion composed of the intertwisted ends and apt to catch on other objects adjacent to the one around which the tie was formed. The difficulties of producing a neat tie, of disposing the intertwisted ends so that they would not catch on other objects, of manually tensioning the wire around the package, and of avoiding a waste in estimating the length of wire required in each instance, have all mitigated against the use of wire for the general purposes mentioned, although wire has been admittedly cheaper than cordage of the same strength.

To overcome these difficulties, my invention provides a machine which uses the wire direct from the coil or reel, and which automatically compensates for variations in the periphery of the object packaged, and which cuts off the wire when the tie is being finished, thereby reducing the waste to a minimum; to intertwist each end of the wire tie with a portion of the tie spaced from the other end, thereby affording a pair of twists adapted to lie close to the package; to hold the initial wire loop in convenient position for inserting the desired object through it; to draw the wire around the object at the desired tension and to avoid overstraining it; to automatically release the wire loop from its supports during the tensioning; to start the twisting automatically when the desired tension of the wire is reached; to continue the twisting after the ends of the wire have been severed, so as to turn the free ends of the twists toward the interior of the loop; to provide a machine for this purpose in which certain parts may easily be thrown into action; to provide for an easy and rapid manual manipulation of the wire parts before the mechanically driven elements are set into operation, and to insure a stopping of certain of the elements in a position enabling an instant removal of the tied package and a ready placing of the next wire portion; to provide means for holding the object which is to be packaged, and means for preventing overlapping portions of the wire loop from snapping out of their proper positions before the intertwisting is started; and to provide means for raising the wire-tied object clear of the mechanism. Other objects will appear from the following specification and from the accompanying drawings, in which Figure 1 is a plan view of a machine embodying my invention, with portions of wire loop and of the loop-support cut away.

Fig. 2 is a side view of the machine.

Fig. 3 is a fragmentary elevation of the shaft of the machine, showing the gear and the cutters mounted on it, and illustrating, also, portions of the guides for the twister.

Fig. 10 is an enlarged front elevation of the clip which initially supports the upper portion of the wire loop.

Figures 1, 11:
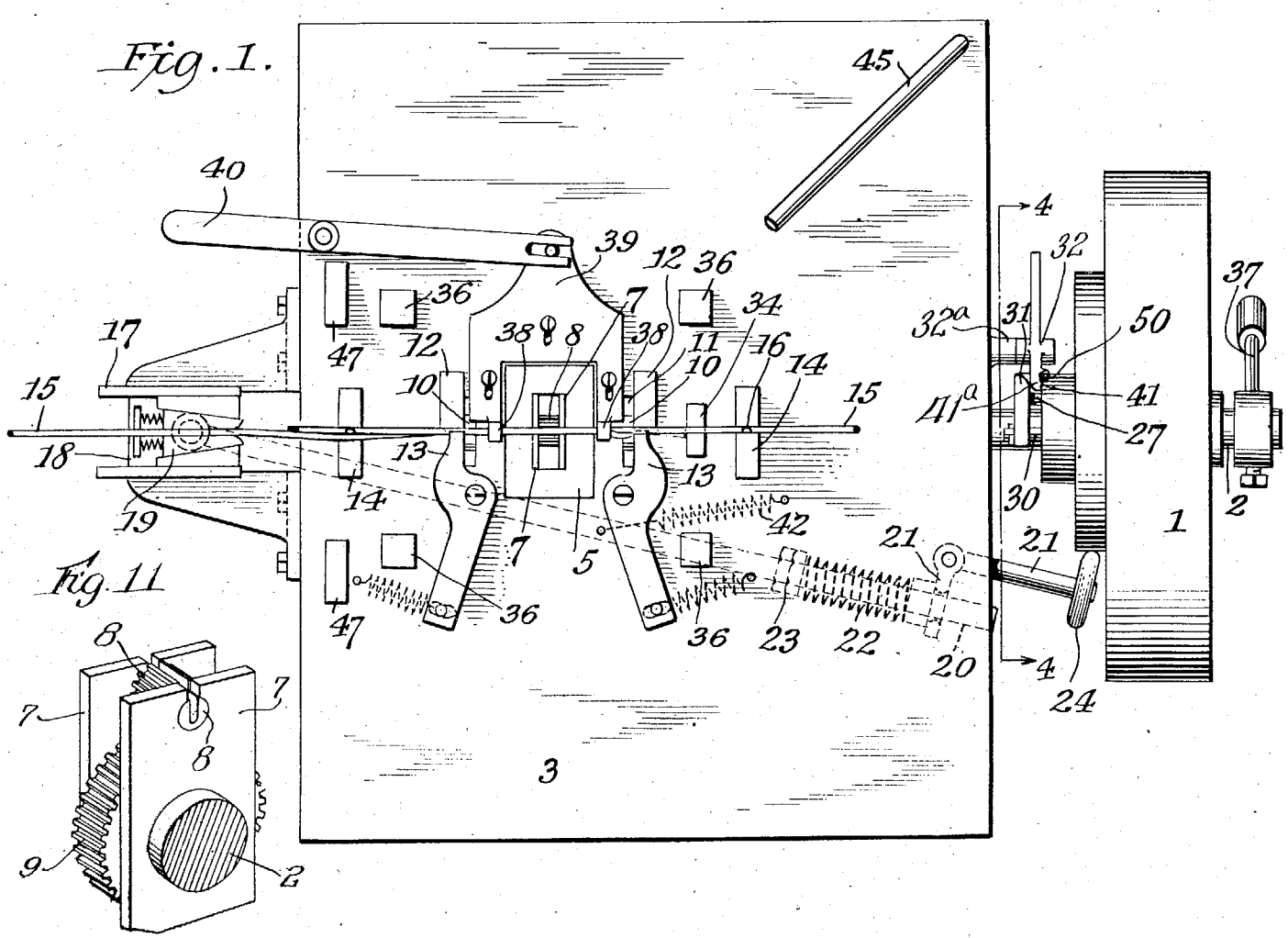
Fig. 11 is a perspective view illustrating guides provided with alined slots and showing parts of the twisted pinion, the shaft and the gear on said shaft.
Figure 4:
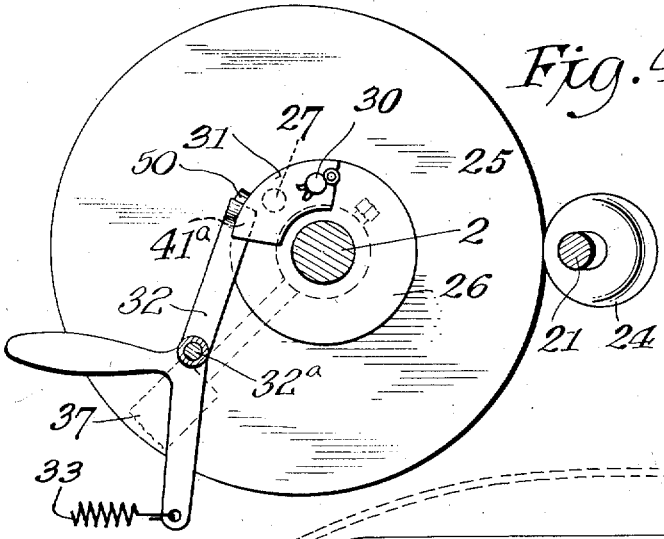
Fig. 4 is an enlarged view showing portions of the clutch mechanism and of the cam arrangement for operating the tensioning of the wire taken on the line 4—4 of Fig. 1.
Figure 9:
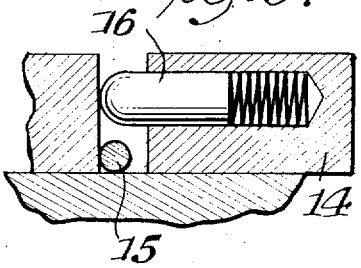
Fig. 9 is an enlarged fragmentary view of one of the latches which initially hold the lower portions of the wire loop in position.

In the embodiments of the drawings, my appliance is shown in the form of a power-driven machine having a continuously rotating pulley 1 loosely mounted on a shaft 2 which shaft extends horizontally under a table 3 through bearings 4. The table 3 has an aperture (here shown as rectangular) through which a lifter frame 5 projects, this frame being movable by means of lifting fork 6 shown in Figs. 2 and 7. Disposed within the frame 5 and normally projecting above it are guides 7, and a pinion 8 floatingly disposed between these guides and meshing with a spur gear 9 fast upon the shaft 2. The pinion 8 is equipped with a slot slightly wider than the diameter of the wire which is to be used on the machine, which slot extends (preferably radially) somewhat beyond the axis of the pinion, there being alined slots of larger diameter in the guides 7. As shown in Fig. 2, the guides 7 extend below the table 3 down to plane of the shaft 2, the latter passing loosely through said guides and operating in conjunction with the slot, shown in plan in Fig. 1, provided in the lifter frame, 5, to retain guides 7 stationary with respect to the pinion 8, said pinion being supported in an operative position by and between said guides 7, and the wire loop being adapted to be received within the alined slots of said guides. The shaft 2 also carries cutters 10 adapted during a certain part of each revolution of this shaft to project and operate through slots 11 in the table, the cutters being of such length that the upper-most portions of their paths will be substantially in line with the axis of the floating pinion 8. Mounted at the farther sides of the slots 11 from said pinion are pairs of spring clamps, each consisting of a fixed jaw 12 and a spring-actuated pivoted jaw 13, the tip of each pivoted jaw being so disposed with respect to its pivot as to resist the movement toward the pinion 8 of a wire extending from the slot in said pinion to the said jaw. Still further to each side of the pinion 8 than the said spring clamps are spring clips 14, each desirably arranged as in Fig. 9 for holding a portion of the wire 15 under it, but permitting the spring plunger 16 to retract and release the said wire upon a sufficiently strong upward pull on the wire At the end opposite the pulley 1, the table 3 carries guideways 17 for a slide 18 carrying a pair of spring-pressed wedge jaws 19. The slide 18 is pivoted to one end of a thrust rod 20 extending under the table and projecting at its other end loosely through one arm of a bell-crank lever 21 pivoted to the table. This lever operates on the rod 20 through a compression spring 22, the tension of which may be adjusted by nuts 23, and the other end of the lever carries a roller 24 bearing against the periphery of a cam 25 which is fast upon the pulley 1 and preferably integral with the latter. Fast upon the shaft 2 and adjacent to the cam 25 is a clutch body 26 carrying a plunger 27 adapted to project beyond the body 26 and into engagement with a ratchet formation 28 on the cam 25, this plunger being continuously urged toward its said engaging position by a spring 29 acting on a piston 30 which piston is connected to the plunger 27 by a strap 31. The strap 31 preferably is a portion of a ring concentric with the shaft 2, and has one end tapered to produce thereon a cam surface 31*a*, see Fig. 8, so that the tip 41*a* of a release lever 32 may enter between this cam surface of the strap and the clutch body 26, as shown in Fig. 8, thereby moving the plunger 27 out of its said cam-engaging position. The lever 32 is fulcrumed on a stationary hanger 32*a* depending from table 3, see Fig. 1, and said lever is preferably continuously urged in one direction by a spring 33, and has at its tapered tip a shoulder 41 (shown in Figs. 4 and 8) adapted to engage a stop pin 50 so as to stop a further rotation of the clutch body 26 after the tip of the lever 32 has entered between this body and the end of the strap 31.

Figure 5:
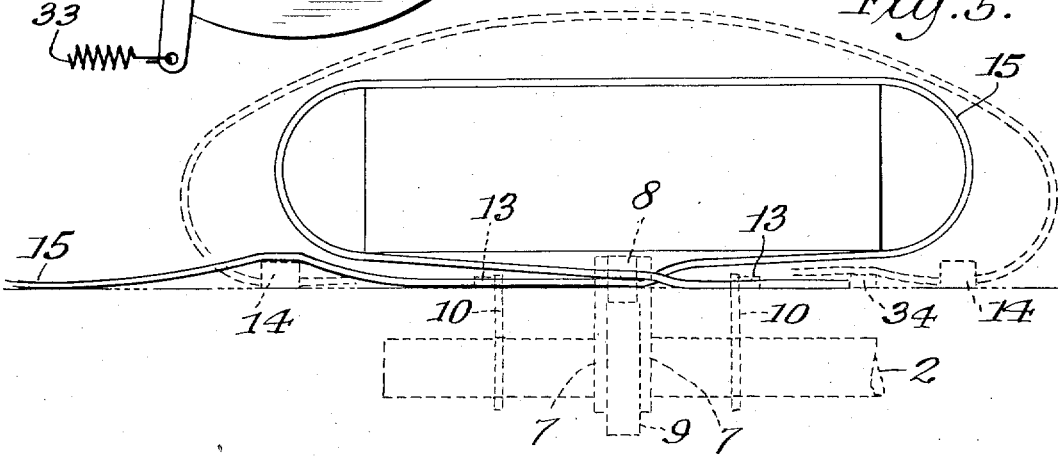
Fig. 5 shows the position of the wire loop with respect to a package just before the machine begins tensioning the wire; also, in dotted lines, the initial size of the wire loop.

In operation, wire is drawn from a coil or reel (suitably disposed to the left of the machine in Fig. 2 but not shown in the drawing) and is formed into a loop having two of the lower portions overlapped and both slipped into the slot in the pinion 8, the portion leading from the reel or coil being lowermost in the said slot but being then kept above the free end of the wire, which free end is butted against a low stop 34, as shown in Figs. 2 and 5. When thus forming the wire loop by hand, the top of the loop is snapped between the jaws of a spring clip 35 supported by a gooseneck 45 mounted on the table 3, this gooseneck being so shaped as to bring the clip 35 directly above the pinion 8. Other portions of the wire loop are snapped under the latches 14, and the free end portion of the wire is gripped by the right-hand spring clamp 12 and 13 so as to resist a tendency to pull the tip of the wire away from the stop 34, while the portion of the wire leading from the coil or reel is clutched by the left-hand clamp 12 and 13, thereby preventing additional wire from being fed to the loop. Then the object to be tied is inserted in the loop, where it is held clear of the mechanism by posts 36 and is placed with one side against the riser 47, as shown in Fig. 2, after which the loop is partly tightened by hand by pulling the coil end of the wire toward the left. Next, the coil end of the wire is slipped between the jaws 19 on the slide 18, so that the moving of this slide by the thrust rod 20 will cause the machine to effect a further tightening of the wire, since every rotation of the cam 25 actuates this thrust rod through the agency of the lever 21 and the spring 22. Since the jaws 19 operate in the same direction as the left-hand spring clamp 12 and 13, the wedgingly mounted jaws 19 may open on the returning movement of the slide 18, and as the clamp 12 and 13 will prevent the wire from slipping, the next movement of the slide toward the left will cause the jaws 19 to take a fresh grip on the wire. Consequently, the rapidly repeated pushes of the rod 20 actuates the tensioning slide 18 and the jaws 19 so as to tighten the wire loop with a step by step movement around the package until the tension of the spring 22 is reached, after which the slide 18 remains stationary and the further movement of the lever 21 only serves to alternately compress and relax the spring 22, the effect of which is to avoid overstraining the wire. As soon as this point is reached (that is to say, as soon as the wire binding has been tensioned to the degree for which the spring 22 is adjusted by the nuts 23), the release lever 32 is moved out of its stop position of Fig. 4, thereby permitting the plunger 27 to engage the ratchet formation in the cam and hence causing the continually revolving cam to rotate the shaft 2 with it.

A light spring 42 connects the rod 20 to the table and returns this rod after each thrust, besides aiding the spring 22 to limit the tensioning of the wire. During the operations of placing the wire loop and of tensioning said loop into the desired tight engagement with the object, the shaft 2, clutch body 26, gear 9, and twister pinion 8 remain at rest. With the twister pinion 8 at rest, the wire loop is readily placed by hand in the slot of said pinion and in the alined slots of guides 7, as well as in the latches 14 and into gripping engagement between the jaws 12, 13, of the right-hand spring clamp and the similar jaws 12, 13, of the left-hand spring clamp. Furthermore, with the twister pinion 8 and the parts associated therewith at rest, the operator is enabled to easily draw the wire loop around the object by hand, for taking up slack in said wire loop. Again, with the tension slide 18 and jaws 19 in motion under the action of the cam 25, lever 21 and thrust rod 20, that part of the wire loop which passes from the twister pinion 8 between the left-hand spring clamp (jaws 12, 13) to the coil, is free to slide through the slot in said twister pinion when the latter is at rest, whereby the means for tensioning the wire loop is enabled to function without hindrance from the twist-forming mechanism. As indicated herein, any desired degree of tension may be placed upon the wire loop by adjusting the nuts 23 for controlling the tension of the spring 22 associated with the thrust rod 20, but in practice it may be desirable to tighten the loop to a sufficient tension for causing the wire to indent the edges of the package, the effect of which is to preclude the loop from slipping off the package when the wood of said package shrinks to a substantial degree.

Figure 7:
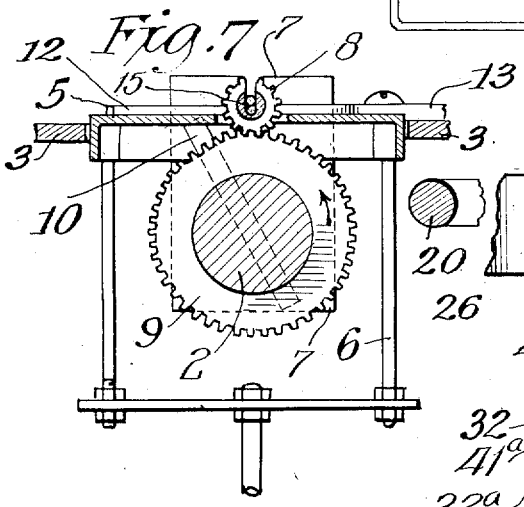
Fig. 7 is an enlarged section through the gear of Fig. 1, showing the wire-twisting pinion and parts adjacent to the same.
Figure 8:
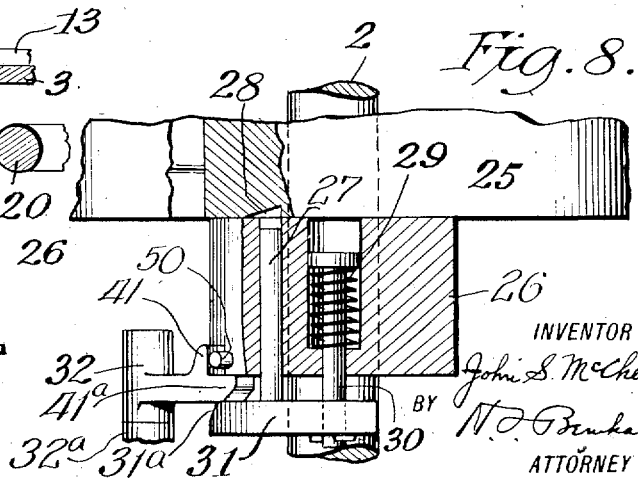
Fig. 8 is an enlarged fragmentary view, partially in section showing the clutch mechanism.

The wire loop having been tensioned, the twist forming mechanism is brought into service by operating lever 32 by hand so as to shift said lever in a direction to withdraw its tip 41*a* from position between the clutch body 26 and the strap 31, thereby permitting spring plunger 30 to force strap 31 and plunger 27 inwardly to position for said plunger to contact with the ratchet formation 28 of the cam 25, as a result of which the rotative movement of said cam imparts rotative movement to the clutch body 26, the shaft 2, the gear 9, and twister pinion 8, said gear 9 rotating in the direction of the arrow in Fig. 7.

Figure 6:
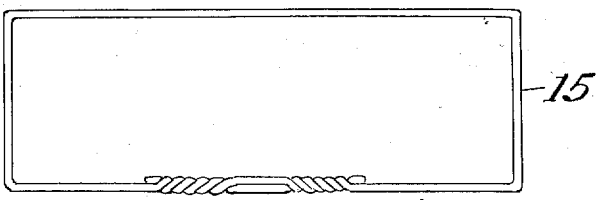
Fig. 6 shows the finished wire band.

As soon as the shaft begins to rotate from its initial position of Fig. 7, the gear 9 turns the floating pinion 8 (which pinion is kept clear of the package by supporting said package in an elevated position on the posts 36), thereby twisting the overlapped wire portions at each side of this pinion. The twist of the end portions of the wire loop is obtained by the rotative movement of the twister pinion 8 and by retaining during said rotative movement of the twister the overlapped end portions of said loop in fixed position by the herein described wire-retaining means comprising, in the exemplification of the invention herein disclosed, the two spring clamps (jaws 12, 13), the low stop 34, and the loop locating latches 14. As shown in Figs. 2 and 5, the free or unconfined terminal portion of the wire loop is in abutting contact with the low stop 34, and is gripped near said free end between the jaws 12, 13, of the right-hand spring clamp; said gripped length of the wire then passes through the slotted twister pinion 8; is then positioned above the jaws 12, 13, of the left-hand spring clamp, and then extends through the left-hand spring clip 14, upwardly around the object, passing from the left-hand side thereof toward and down the right hand side, being then engaged by the right-hand spring clip 14, thence passing over the low stop 34 and over the right-hand spring clamp (jaws 12, 13), thence crossing the first described length of said wire and passing again through the slotted twister pinion, thence passing between the jaws 12, 13 of the left-hand spring clamp so as to be gripped thereby, and passing thence over the left-hand spring clip 14 to the tensioning device 18, 19, and finally to the coil. The overlapping terminal portions of the wire loop are thus gripped by the right-hand spring clamp (jaws 12, 13) and by the left-hand spring clamp (jaws 12, 13) respectively at opposite sides of the twister pinion and the side by side lengths of said wire are spaced relatively to each other as shown in Fig. 5, such spacing being due to the fact that the length of said wire is in the plane of the spring clamp, whereas the other adjacent length of the wire passes over the spring clamp, this being the case in the relation of the two lengths of said wire to each of the spring clamps, as a result of which the two lengths of wire are gripped and held in spaced relation at the side by side terminal portions of the loop, so that the said terminal portions are restrained or held in such spaced relation during the rotative movement of the twister pinion, and thus the gripped and spaced terminal portions of the loop are restrained by the retaining means from turning movement with reference one to the other, except that movement given to said terminal portions by the rotation of the twister pinion in order to give the desired double twist to said wire as shown in Fig. 6. Meanwhile, the manually operated release lever 32 has been released and the spring 33 causes it to hold its tip 41*a* ready to wedge between the clutch body and the strap 31 when the cam has almost completed one revolution, thereby unlatching the clutch and allowing the clutch body, together with the shaft upon which the latter is fast, to be stopped by the engagement of a pin 50 on the clutch body with a shoulder 41[a] on the lever 32. To insure a continuing of the rotation of the shaft to the point at which the slot in the pinion is exactly vertical, i. e., in alinement with the slot in guide 7 so as to permit an easy release of the wire from the machine, I preferably mount on the shaft a weighted arm 37 so positioned with respect to the strap 31 that it will tend to continue the rotation of the shaft until the pin 50 positively engages the shoulder 41 on the lever 32. Before the shaft reaches this stopping position, the cutters 10 (which, as shown in Fig. 7, are mounted in advance of the initial position of the shaft) shear past the tip ends of the pivoted jaws 13 of the spring clamps, as will be readily apparent by the relation of said cutters 10 to the pivoted jaws 13 shown in Fig. 1, and thus the cooperation of said cutters 10 with the pivoted jaws 13 will operate to cut off both of the lower wires of the loop as shown in Fig. 5; that is to say, one cutter clips a short piece off the free end and the other severs the loop from the supply portion of the wire. However, since the cutters are mounted in advance of the initial position of the shaft, the intertwisting of the overlapped wire portions continues after this cutting, thus turning the wire ends in the finished loop toward the interior of the loop as shown in Fig. 6. During this completion of the twisting, one of the cutters 10 pushes a slide 39 out of the way, thereby releasing auxiliary latches 38 which prevent the wire portions from slipping prematurely out of the slot in the floating pinion, this slide being returned to its operative position by a lever 40. When the tie is thus finished, the package may be raised by means of the lifting fork 6, which causes the frame 5 to strip the wires out of the pinion 8; or, the package may merely be slid along on the posts 36 in case another loop is to be placed over it.

It will be evident from the above that after the wire loop has been manually disposed as in Fig. 2, the machine automatically performs the cycle of operations comprising the tightening of the wire to a predetermined tension, the forming of the two twists, and the cutting off of the twist ends at the proper time during the twisting operation, the releasing of the auxiliary latches 38 which keep the wires from slipping out of the slot in the pinion, the turning of the extreme wire ends toward the interior of the loop, and the stopping of the operative mechanism when the tie is finished. Moreover, since the posts 36 keep the object clear of the pinion 8 at the time said object is being wrapped, and since the latches 38 prevent portions of the wire adjacent to the twists from being drawn against the object, my appliance may be used even with objects having a delicate surface, such as paper-wrapped packages. So also, if the object wrapped is incompressible, the loop after being completed may be slipped off the object (in a form shown for example in Fig. 6), so that my appliance may also be used for forming wire loops suitable for use as hoops, hose-bands or the like.

In accordance with the provisions of patent statutes, I have described the principle of operation of my invention, together with the apparatus which I now consider to represent the best embodiment thereof; but I desire to have it understood that the apparatus shown is only illustrative, and that the invention can be carried out by other means.

I claim as my invention:

1. A wire loop closing machine, including means for holding the loop with each of its intended terminals overlapping a wire portion spaced from the other terminal, means for intertwisting each intended terminal portion with the wire portion overlapped thereby, and means for cutting off one of the said terminal portions, the cutting means being so timed in operation with respect to the twisting means that the cut end will be directed substantially toward the interior of the finished loop.

2. A wire loop closing machine, including means for holding the loop with relatively overlapped ends, means for tightening the loop to a predetermined degree of tension, and means for thereafter intertwisting each end portion of the loop with the part of the wire adjacent thereto without relaxing the tension on the loop.

3. A package tying machine, including means for holding a wire loop with relatively overlapped ends, a support for a package to maintain the same within said loop, and means for tightening the wire to a predetermined degree of tension about the package subsequent to the formation of the loop.

4. A package tying machine, including means for holding a wire loop with relatively overlapped ends, a support for a package to maintain the same within said loop, means for tightening the wire about the package to a predetermined degree of tension subsequent to the formation of the loop, and means for thereafter intertwisting two relatively spaced parts of the overlapped wire portions while the wire is under the said predetermined tension.

5. A package tying machine, including means for maintaining a wire loop around the package with two portions of the loop relatively overlapped, power-driven and continuously reciprocating means for tensioning the wire around the package subsequent to the formation of the loop, and normally inoperative means for intertwisting a part of the relatively overlapped wire portions operable subsequent to the tensioning of the loop.

6. A package tying machine, including means for maintaining a wire loop around the package with two portions of the loop relatively overlapped, power-driven reciprocating means for tensioning the wire around the package, and means for adjusting the last named means to vary the said tensioning.

7. A package typing machine, including means for holding a wire loop with relatively overlapped ends, means for maintaining a package within said loop, means for spacing the overlapped wire portions from the package, means engaging a part of the wire portions thus spaced from the package and arranged for intertwisting a part of the said wire portions, and common means for actuating the last-named means and for severing the wire adjacent to the twist, the severing means being arranged for operating approximately a half turn before the cessation of the twisting.

8. A package tying machine, including means for holding a wire loop with relatively overlapped ends, means for maintaining a package within said loop, means for spacing the overlapped wire portions from the package, means engaging a part of the wire portions thus spaced from the package for intertwisting said wire portions, means for severing the wire adjacent to the twist, and means for discontinuing the intertwisting at a predetermined point after the said severing.

9. In a wire loop forming machine, wire tightening means including a reciprocable slide, means carried by the slide for gripping the wire to move the same in one direction only, and means limited by a predetermined tension of the wire for reciprocating the slide.

10. In a wire loop forming machine, wire tightening means including a reciprocable slide, means carried by the slide for gripping the wire to move the same in one direction only, a continuously reciprocated member, and connecting means interposed between said member and slide and including a spring arranged for rendering the connecting means inoperative against the predetermined resistance to the movement of the slide.

11. A wire loop closing machine including means for holding the wire loop with relatively overlapped end portions, fixed and rotatable means engaging parts of said overlapped wire portions, means for revolving the rotatable means to intertwist certain of the overlapped wire portions, latching means for holding certain wire portions in operative relation with respect to said fixed and rotatable means, and means for releasing the latching means substantially at the completion of the intertwisting.

12. A wire loop closing machine, including means for holding the wire loop with relatively overlapped end portions, fixed and rotatable means engaging parts of said overlapped wire portions, means for revolving the rotatable means to intertwist certain of the overlapped wire portions, latching means for holding certain wire portions in operative relation with respect to said fixed and rotatable means, and common means for severing the wire ends and releasing the latching means.

13. A wire loop closing machine, including means for holding the loop with each of its intended terminals overlapping a wire portion spaced from the other terminal, means to tighten the loop around a package embraced thereby to a predetermined degree of tension, means for intertwisting each intended terminal portion with the wire portion overlapped thereby, and cutting means separate from the said intertwisting means for cutting off one of the terminal wire portions adjacent to the resulting twist.

14. A wire loop closing machine, including means for holding the loop with each of its intended terminals overlapping a wire portion spaced from the other terminal, means for intertwisting each intended terminal portion with the wire portion overlapped thereby, and means separate from and located at each side of the said intertwisting means for cutting off each terminal wire portion before the completion of the intertwisting.

15. A package tying machine, including means for holding a loop of wire previously formed to the insertion of the package and with terminal portions of the loop relatively overlapped, means for tightening the loop to an automatically predetermined tension sufficient to cause the wire to bear flatwise against all sides of the package except the one opposite the said overlapped wire portions, and means for thereafter uniting the said terminal portions.

16. A machine for wire-banding an angularly sectional package, including means for disposing a loop of wire to receive the package and with portions of the loop relatively overlapped adjacent to one flat side of the package, means for tightening the loop subsequent to the insertion of the package, to a sufficient tension for causing the wire to indent the corners of the package, and means for intertwisting the overlapped wire portions while maintaining the tension on the loop.

17. In a package banding machine, a support for a package, wire-twisting means carried by the support, and means for holding a loop of wire in operative relation to the twisting means and disposed for inserting the package therein.

18. In a package banding machine, a support for a package, and means carried by the support for holding a loop of wire in position for inserting a package therein, the loop-holding means being adapted to be released by a tightening of the loop about the package.

19. In a package banding appliance, means for spreading a loop to a bore greater than the periphery of the package, and means for tightening the loop about the package, the said loop-spreading means being operatively released by the said tightening of the loop.

20. In an appliance for banding a package with a wire loop, a support for the package, and means carried by the support for determining the plane of the wire loop and holding the loop in such plane irrespective of the package.

21. In an appliance for banding a package with a wire loop, a support for the package, means carried by the support for determining the plane of the wire loop, and means for tightening the loop about the package, the said plane-determining means being so arranged as to be released by the tightening of the loop.

22. In an appliance for banding a package with a wire loop, a support for the package, means carried by the support for determining the plane of the wire loop, and means operating substantially in the said plane for tensioning the loop about the package and rendering a portion of said first means inoperative.

23. In a package banding appliance, a support upon which a package is adapted to rest, a support to hold a wire loop in encompassing relation to the package when resting upon said support, wire-twisting means carried by the support and including a rotatable pinion having a radial slot adapted to receive terminal portions of the loop in overlapping relation; and a pair of grippers on opposite sides of the pinion and substantially in alinement with the said slot, for gripping portions of the wire loop to prevent enlargement of the latter.

24. In a package banding machine, wire twisting means, two wire gripping means substantially in alinement with the wire twisting means and respectively at opposite sides of the latter; and means for drawing the wire through the wire twisting means and through one of the said gripping means to tension the same to an automatically predetermined degree of tension.

25. In a package banding appliance, a table arranged for supporting a package and having an aperture adjacent to the package, a wire twisting pinion rotatably mounted on the table and projecting upwardly through the said opening, and a gear disposed below the table and meshing with the pinion.

26. In a package banding machine, a support for a package, a rotatable wire-twisting pinion having a radial slot and mounted on the support for movement toward and from the package, and means for stopping the pinion in a position in which the slot is directed toward the package.

27. In a package banding machine, a support across which the banding wire is fed, means above the support for holding the upper portion of a loop formed from the wire, and means on the support for holding the terminal portions of the formed loop against enlargement of the loop but permitting the wire to slip therethrough for tightening the loop.

28. In a package banding machine, a support across which the banding wire is fed, means above the support for holding the upper portion of a loop formed from the wire, and means for twisting the terminals of the wire loop together.

29. A package banding machine comprising continuously operating loop tightening means including a slip joint operable to prevent effective operation of said means upon predetermined tightening of the loop.

30. A wire loop forming machine including a plurality of jaws positioned for the reception of a plurality of side by side disposed wires and operating to preclude twisting of said wires at their points of reception, means for engaging said wires and operable for twisting the wires intermediate of said jaws, and a movable cutter cooperating with each of said jaws to sever both wire ends adjacent its cooperating jaw.

31. In a wire loop closing machine, two separated jaws adapted for the reception of two side by side disposed wires and to prevent the twisting of said wires, means for engaging and twisting said wires intermediate of said jaws, and a movable member cooperating with one of said wire holding jaws to form a wire cutter therewith.

32. In a wire loop closing machine, a plurality of jaws positioned for grasping a plurality of side by side disposed wires and operating to preclude said wires from twisting at their points of grasp, means for engaging said wires and operable for twisting the same intermediate of said jaws, and a movable cutter cooperable with one of said wire grasping jaws, the cutting edges of said movable cutter being limited to cut only one of said wires.

33. A wire loop closing machine including a plurality of releasable retaining clamp jaws positioned in separated relation to each other and operating to hold terminal portions of a wire loop in side by side relation to each other, in combination with means for placing a predetermined degree of tension on said wire loop while so retained, and means for uniting said side by side disposed terminal portions while said loop is under tension.

34. A wire loop closing machine including a plurality of releasable retaining clamp jaws positioned in separated relation to each other and operating to retain terminal portions of a wire loop in a side by side relation to each other, in combination with means for placing tension on said wire loop while the terminal portions are retained in said side by side relation, and means for uniting together the side by side disposed terminals of said loop intermediate said plurality of retaining clamp jaws.

35. A wire loop closing machine including retaining clamp jaws operable by contact with terminal portions of a wire loop for engaging and retaining said terminal portions in side by side relation with respect to each other, means for automatically tensioning to a predetermined degree said loop while so retained, and means for uniting together said terminal portions while said loop is under tension.

36. A wire loop closing machine embodying retaining clamp jaws operable to grasp terminal portions of a wire loop for holding said terminal portions in side by side relation with respect to each other, means separate from the retaining clamp jaws for tensioning said loop while its terminal portions are retained in said side by side relation, and twisting means operable upon the side by side disposed terminals of said loop for uniting said terminals.

37. A wire loop closing machine embodying retaining clamp jaws operable by contact with terminal portions of a wire loop for retaining said terminal portions in side by side relation with respect to each other, twisting means contacting with said side by side disposed terminal portions of the loop so as to leave intervals of appreciable width between the points of contact of said twisting means and the points of contact of the retaining jaws with said terminal portions, and means for imparting rotative movement to said twisting means whereby the side by side positioned terminal portions are intertwisted at the intervals between the contacting point therewith of said twisting means and the retaining means.

38. A wire loop closing machine embodying retaining clamp jaws operable by contact with terminal portions of a wire loop for engaging and retaining said terminal portions in side by side relation with respect to each other, twisting means contacting with said side by side disposed terminal portions of the loop so as to leave intervals of appreciable width between the points of contact of said twisting means and the point of contact of the retaining means with said terminal portions, means for tensioning said wire-loop while in contact with said retaining means, and means operable subsequently to said tensioning means for imparting rotative movement to the twisting means.

39. A wire-loop closing machine including a plurality of pairs of clamping and retaining jaws in separated relation to each other each pair operable by contact with the terminal portions of a wire loop for holding said terminal portions in side by side relation with respect to each other, means for twisting said side by side terminal portions of the loop at points intermediate the contact of said retaining devices and the contact of said twisting means with said terminal portions, and cutting means cooperable with one of said retaining devices for severing one of said terminal portions of the loop.

40. A wire-loop closing machine including a plurality of pairs of clamping and retaining jaws positioned in separated relation to each other and adapted for clamping engagement with terminal portions of a wire loop for gripping and holding said terminal portions in a separated condition and in side by side relation with respect to each other, and means for twisting together said terminal portions at points intermediate the contact therewith of the retaining means and said twisting means, whereby said terminal portions are intertwisted at points located on opposite sides of the twister.

41. A wire-loop closing machine including a wire gripper for gripping one end of a wire prior to passing said wire around an object, means for retaining terminal portions of said wire in side by side relation with respect to each other, means for tensioning said wire while so retained, to a predetermined degree of tension, and a twister positioned for intertwisting said terminal portions of the wire while the latter is maintained under said tension.

42. A wire-loop closing machine including means for grasping one end of a wire prior to positioning said wire relatively to an object, means for retaining terminal portions of said wire in side by side relation with respect to each other, means separate from said retaining means for tensioning said wire, means for twisting together said terminal portions of the wire, and means cooperable with said retaining means to form a cutter for severing one of said terminal portions.

43. A wire-loop closing machine including a frame, a plurality of movable members for clamping the terminal portions of a wire-loop in lapped side by side oppositely directed relation, a twister pinion for twisting the wire between its ends while so held, and automatically acting means operable on the wire subsequently to the action of said twister pinion for cutting different wires at opposite ends of the tie.

44. In a wire-loop closing machine, the combination of movable means for holding terminal portions of a wire loop in side by side relation, means for automatically tensioning said wire loop to a predetermined degree of tension while so held, means for twisting said terminal portions of the wire while the loop is under tension, and means for cutting one terminal portion of said wire loop, said cutting means being operable at a period subsequently to the twisting of said terminals.

45. In a wire-loop closing machine, the combination of means for holding terminal portions of a wire loop in side by side oppositely directed relation, automatically acting tensioning means for said wire loop, a shaft and a gear for twisting the terminal portions into a flat knot while said loop is under tension, and cutting means operated by said shaft for cutting one terminal portion of said wire loop without cutting the adjacent wire.

46. In a wire-tying machine, the combination of a slotted twister pinion operable for twisting together two lapped and oppositely directed parts of a wire loop, means for tensioning said wire prior to the operation of said twister pinion, and automatically acting means operable on one of said wire parts for cutting the same subsequent to the formation of the twist in said wire.

47. In a wire-tying machine, the combination of means for pulling a wire tight around a package under a predetermined degree of tension means for holding two lengths of the wire in a lapped and oppositely directed position beneath the package, means for twisting together a portion of said two lengths, and automatically acting means for cutting off one of said lengths subsequently to the formation of the twist in said wire by the action of said twisting means.

48. In a wire-tying machine, the combination of retaining means for holding terminal portions of a wire loop in side by side relation, automatically acting means operable with a step by step motion for tensioning said loop to a predetermined degree of tension, and means for uniting said terminal portions of the loop.

49. In a wire tying tool, two separated jaws adapted for the reception of two parallel-disposed wires and to prevent their twisting, means for engaging and twisting said wires intermediate of said jaws, and a movable member co-operating with one of said wire holding jaws to form a wire cutter, the cutting edges of said wire cutter being limited to cut only one of said wires.

50. In a wire tying machine, means for twisting together two parallel wires, and cutters movable from below to cut the surplus wire ends at each end of the twist.

51. In a wire tying machine, the combination of devices for holding, tensioning and tying together two bights of wire into a single tie, actuators for said tensioning device and said tying device, an ejector acting to bear forcibly against the wire after it is tied and eject it from the machine, and means for actuating said ejector.

52. In a wire tying machine, the combination of devices for holding, tensioning and tying together two bights of wire, actuators for said tensioning device and said tying device, a slidable reciprocating ejector acting to bear forcibly against the wire after it is tied and eject it from the machine, and means for actuating said ejector.

53. In a wire tying machine, the combination of devices for tensioning and tying together two bights of wire, actuators for the tensioning and tying devices, and an ejector operable to bear forcibly against the wire after it is tied and eject it from said machine.

54. In a wire tying machine, the combination of devices for tensioning and tying together two bights of wire, actuators for said tensioning and said tying devices, an ejector operable to bear forcibly against the wire after it is tied and eject it from said machine, and means to return the ejector to initial position.

55. In a wire tying machine, the combination of devices for tensioning and tying together two bights of wire, an ejector acting to bear forcibly against the wire after it is tied to eject it from the tying device, actuators for operating said tensioning device and said tying device, means for actuating the ejector, and means for holding the wire in said machine during tensioning and tying operations.

56. In a wire tying machine, the combination of devices for tensioning and tying together two bights of wire, actuating devices for said tensioning devices and said tying device, an ejector carried by said machine for ejecting the bights of wire after they have been tied, and a detent for retaining said bights of wire in normal position in said machine during the tying operation and arranged to be moved out of retaining position during the ejecting operation.

57. In a wire tying machine, the combination of a plurality of devices for holding, tensioning and tying two bights of a wire, actuating means for said tensioning device and said tying device, a reciprocating ejector positioned for contact with said wire and operable for forcibly ejecting the same from the machine after said wire is tied, and means for actuating said ejector.

58. In a wire tying machine, the combination of a plurality of devices for holding, tensioning and tying two bights of a wire, actuating means for said tensioning device and said tying device, an ejector acting to bear forcibly against said wire after it is tied and to eject the tied wire from the machine, and means for actuating said ejector.

59. In an appliance for banding an object with binding material, means for directing binding material into the form of a loop the diameter of which exceeds the size of the object to be bound, means for automatically feeding said binding material, means for tensioning said binding material, means for severing the loop of such binding material from the supply of such material, and means for joining the terminals of said loop subsequently to the tensioning action on said loop.

60. In an appliance for banding an object with binding material, means for directing binding material into the form of a loop the diameter of which exceeds the size of an object to be bound, means for automatically feeding a determined length of such binding material to constitute the loop for encircling an object, means for retaining the terminals of said loop in side by side relation, means for retracting said loop for tensioning the loop into contact with the object, and means for joining the side by side parts of said loop subsequently to said tensioning operation on the loop.

61. In an appliance for banding an object with binding material, means for directing binding material into the form of a loop the diameter of which exceeds the size of an object to be bound, means for automatically feeding a determined length of said binding material to said loop-forming means, means for severing that part of the binding material constituting the loop from the supply of such material, means for retaining the terminal parts of said loop in side by side relation one to the other, means for tensioning the loop, and means operable subsequently to the tensioning means for joining the side by side parts of said loop.

62. In an appliance for banding an object with binding material, means for directing binding material into the form of a loop the diameter of which exceeds the size of an object to be bound, means for automatically feeding the binding material to said loop directing means, and a plurality of mechanisms operating respectively to tension said loop, to sever it at a determined point, and to join the terminals of said loop.

63. In an appliance for banding an object with binding material, the combination of loop-forming means, automatic feeding means for advancing a determined length of binding wire to said loop-forming means, means for retaining the terminals of said loop in substantially parallel relation one to the other, and a plurality of mechanisms acting to respectively tension said loop, to sever it at a determined point, and to join the substantially parallel terminals of said loop.

64. In an appliance for banding an object with binding material, the combination of loop-forming means, means for feeding a determined length of binding wire to said loop-forming means, means for retaining the terminals of said loop in substantially parallel relation one to the other, means for tensioning said loop by retracting the binding wire to effect a reduction in the diameter of said loop, and a plurality of mechanisms acting to sever the binding wire and to join the substantially parallel terminals of said loop.

65. In an appliance for banding an object with binding material, wire feeding and looping mechanisms operable to form a loop the diameter of which exceeds the dimensions of an object to be banded, means for retracting said wire to reduce the diameter of said loop and to tension the loop into tight engagement with the object, means for retaining the terminal parts of said loop in substantially parallel relation to each other during such tensioning of the loop, and means for joining said substantially parallel terminal parts of the loop.

66. In an appliance for banding an object with binding material, wire feeding and looping mechanisms operable to form said wire into a loop the diameter of which exceeds the dimensions of an object to be banded, means operable to retract said looped wire and to reduce the diameter of said loop for tensioning the loop into tight engagement with the object, means for severing the wire, means for retaining the terminal parts of said wire in substantially parallel relation to each other, and means for joining said terminal parts of the wire subsequently to the tensioning of the loop.

67. In an appliance for banding an object with binding material, loop-forming means, loop-tensioning means, retaining means for holding the terminal parts of the loop in substantially parallel relation, and loop-joining means positioned for joining said substantially parallel terminal parts subsequently to the action of said tensioning means.

68. In an appliance for banding an object with binding material, loop-forming means operable for retaining the terminal parts of a loop in substantially parallel relation to each other, loop-tensioning means, loop-joining means for joining said terminal parts of the loop, and mechanism whereby said joining means are effective subsequently to the action of the loop-tensioning means.

69. In an appliance for banding an object with binding material, loop-forming means including devices whereby the terminal parts of a loop are retained in substantially parallel relation to each other, loop-tensioning means, loop-joining means for uniting the terminal parts of said loop, and means for setting said loop-joining means into action subsequently to the action of said loop-tensioning means.

70. In an appliance for banding an object with binding material, loop-forming means including devices whereby the terminal parts of a loop are retained in substantially parallel relation one to the other, loop-tensioning means, loop-joining means operable for uniting said termnial parts of the loop, cutting means, and mechanism for actuating said loop-joining means and the cutting means subsequently to the action of the loop-tightening means.

71. In a wire tying tool, two separate jaws adapted for the reception of two parallel disposed wires and to prevent their twisting, means for engaging and twisting said wires intermediate of said jaws, and a movable member cooperating with one of said wire holding jaws to form a wire cutter.

72. In a machine for tying a wire about an object, a support, means for drawing a wire tightly under predetermined tension about an object resting on the support, means for clamping the tensioned wire in a position wherein tensioned portions of the same are overlapped beneath the object in substantially parallel relation to the face of the support, means for twisting the overlapped portions of the wire together with the tension maintained thereon, and means for cutting single strands of the wire at the ends of the twisted section.

73. In an automatic power operated machine for tying a wire about an object, a driven shaft, a support, means operatively connected with said shaft for drawing a wire taut about the periphery of an object resting on the support under a predetermined amount of tension on the wire, means for thereafter automatically clamping the tensioned wire in a position wherein tensioned portions of the same are overlapped beneath the object in substantially parallel relation to the face of the support, whereby to prevent the wire from loosening up on the object when twisted, means for thereafter automatically twisting the overlapped portions of the wire together with the tension maintained thereon, and means for thereafter automatically cutting one of the wire portions at the end of the twisted section.

74. In an automatic power operated machine for tying a wire about an object, a driven shaft, a support, means operatively connected with said shaft for drawing a wire taut about the periphery of an object resting on the support under a predetermined amount of tension on the wire, means for thereafter automatically clamping the tensioned wire in a position wherein tensioned portions of the same are overlapped beneath the object in substantially parallel relation to the face of the support, whereby to prevent the wire from loosening up on the object when twisted, means for thereafter automatically twisting the overlapped portions of the wire together with the tension maintained thereon, means for thereafter automatically cutting one of the wire portions at the end of the twisted section, and manually operated means for increasing or decreasing the tension under which the wire is drawn about the object.

75. In a wire tying appliance, means for supporting a package to be banded, means below said supporting means for twisting together two side by side positioned oppositely directed ends of a wire looped about the package, and a plurality of cutters respectively disposed at opposite sides of the twisting means in spaced relation to the latter below the wire ends for cutting said ends at the extremities of the twist.

In testimony whereof I have signed this specification at Chicago, Illinois, this 26th day of October, 1922.

JOHN SHERMAN McCHESNEY.